(12) United States Patent
Schram et al.

(10) Patent No.: US 7,806,657 B2
(45) Date of Patent: Oct. 5, 2010

(54) DEVICE FOR DETECTING DAMAGE OF A WIND ENERGY TURBINE ROTOR BLADE DUE TO A LIGHTNING STRIKE

(75) Inventors: Christian Schram, Munich (DE); Florian Krug, Munich (DE)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 11/463,727

(22) Filed: Aug. 10, 2006

(65) Prior Publication Data

US 2007/0041834 A1    Feb. 22, 2007

(30) Foreign Application Priority Data

Aug. 17, 2005   (EP)   ................................ 05107571

(51) Int. Cl.
 *F03D 11/00*   (2006.01)
(52) U.S. Cl. .......................................... 416/61; 416/230
(58) Field of Classification Search .................. 416/61, 416/146 R, 230
See application file for complete search history.

(56) References Cited

U.S. PATENT DOCUMENTS

| | | | |
|---|---|---|---|
| 4,026,660 A | | 5/1977 | Ueda et al. |
| 6,552,521 B1 * | | 4/2003 | Medelius et al. ............... 324/72 |
| 6,612,810 B1 * | | 9/2003 | Olsen et al. .................... 416/95 |
| 6,868,339 B2 * | | 3/2005 | Murphy et al. ................. 702/4 |
| 7,040,864 B2 * | | 5/2006 | Johansen et al. ........ 416/146 R |
| 7,508,186 B2 * | | 3/2009 | Mortensen ..................... 324/72 |
| 2004/0130842 A1 | | 7/2004 | Johansen et al. |

FOREIGN PATENT DOCUMENTS

| | | |
|---|---|---|
| DE | 100 65 314 | 7/2002 |
| DE | 20 2004 001090 U1 | 5/2004 |
| DE | 102 59 680 | 7/2004 |
| WO | WO0133234 A1 | 5/2001 |
| WO | WO 2004/111686 | 12/2004 |
| WO | WO 2005/068834 | 7/2005 |

OTHER PUBLICATIONS

European Patent Office Examiner's Communication issued in connection with corresponding EP Application No. 05107571 on Apr. 15, 2008.

* cited by examiner

*Primary Examiner*—Nathaniel Wiehe
(74) *Attorney, Agent, or Firm*—Global Patent Operation; Douglas D. Zhang

(57) ABSTRACT

The device for detecting damage of a wind energy turbine of a wind energy turbine rotor blade, due to a lightning strike, comprises several magnetic or electric field sensors distributed along the length of a rotor blade of the wind energy turbine for measuring the magnetic or electric field concentration along the rotor blade and, an evaluation unit connected to the magnetic or electric field sensors for receiving the measured signals thereof, wherein damage of the wind energy turbine of the rotor blade caused by a lightning strike is calculated by the evaluation unit based on the measured concentration of the magnetic or electric field along the length of the rotor blade.

8 Claims, 1 Drawing Sheet

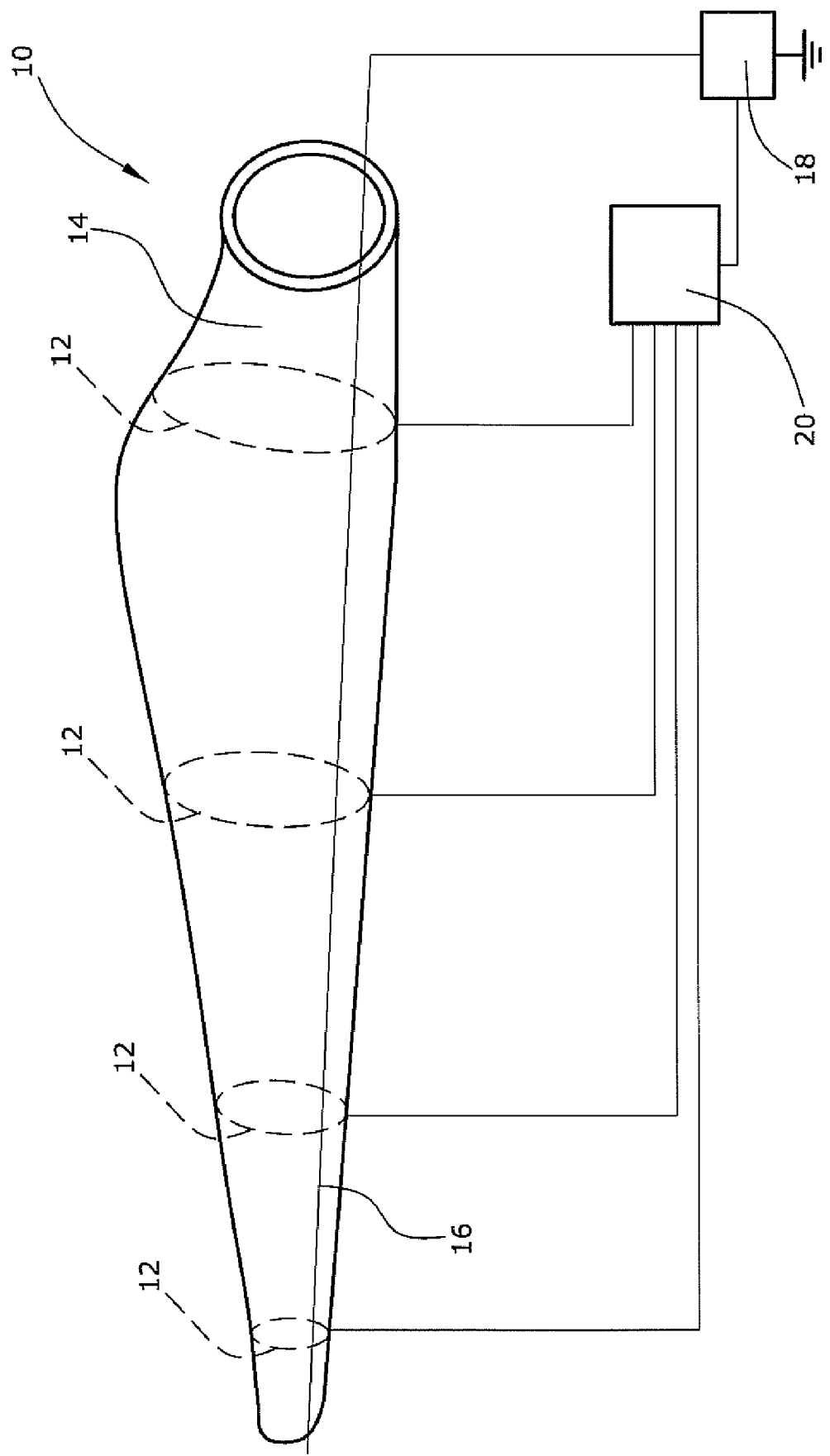

DEVICE FOR DETECTING DAMAGE OF A WIND ENERGY TURBINE ROTOR BLADE DUE TO A LIGHTNING STRIKE

BACKGROUND

1. Field of the Invention

The present invention relates to a device for detecting damage of a rotor blade of a wind energy turbine due to a lightning strike which has hit the rotor blade.

2. Related Prior Art

Lightning protection of the rotor blades of a wind energy turbine is basically known. Such a protection system comprises a conductor extending through and/or along the rotor blade for conducting to ground the current generated in case of a lightning strike hitting the rotor blade. Nowadays lightning protection systems for wind energy turbine rotor blades do not monitor whether or not a rotor blade has been damaged by a lightning strike. However, the aerodynamic properties of the rotor blade can be affected by damages. This in turn means that the wind energy turbine might be less efficient. Also the lifetime of the rotor blade can be shortened due to lightning strikes, which is an effect that also cannot be monitored by the known systems.

Accordingly, there is a need for a system that makes it possible to estimate lifetime and behavior of the components of a wind energy turbine.

SUMMARY OF THE INVENTION

The present invention provides for a device for detecting damage of a wind energy turbine rotor blade or other parts of a wind energy turbine due to a lightning strike, comprising
  several magnetic and/or electric field sensors distributed along the length of a rotor blade of the wind energy turbine for measuring the magnetic and/or electric field concentration along the rotor blade and,
  an evaluation unit connected to the magnetic and/or electric field sensors for receiving the measurement signals thereof,
  wherein damage of the wind energy turbine and, in particular, of the rotor blade caused by a lightning strike is calculated by the evaluation unit based on the measured concentration of the magnetic and/or electric field along the length of the rotor blade.

According to the invention, several magnetic and/or electric field sensors (hereinbelow referred to as field sensors) are embedded in a rotor blade of a wind energy turbine. By these field sensors the magnetic and/or electric field concentration (hereinbelow referred to as field concentration) along the extension of the rotor blade can be measured on the basis of variations of the field concentration compared to the field concentration of an undamaged rotor blade, and damage of the rotor blade due to a lightning strike (i.e. delamination of and/or holes in the composite material of the rotor blade or other components of a wind energy turbine like the hub, the nacelle or its housing) can be calculated in an evaluation unit connected to the field sensors for receiving the measurement signals thereof. Further, a ground current sensor can be provided which is also connected to the evaluation unit. Finally, by applying an analytic model of the lightning behavior of the rotor blade and/or of other parts and/or of the whole wind energy turbine, the type and extent of the damage due to a lightning strike can be calculated. This all gives one the possibility to establish a wind energy turbine lightning lifetime meter to reach a deeper understanding of the lightning protection behaviour of the wind energy turbine. The output of such an advanced lightning detection system could be integrated in the data warehouse of past lightning failure analyses, and an advanced maintenance strategy for the wind energy turbine, in particular for an offshore wind energy turbine application, could be developed.

In a preferred embodiment of the present invention, the field concentration sensors are ferromagnetic loop-wires embedded in the shell of a rotor blade. These sensors can be connected via fiber wires to be lightning resistant. An antenna or several antennas can be also arranged in the rotor blade. This antenna is the ground conductor for conducting the lightning current to ground.

BRIEF DESCRIPTION OF THE DRAWING

The present invention will be described in more detail referring to the drawing which schematically shows the main components of the lightning detection system according to the invention.

DESCRIPTION OF A PREFERRED EMBODIMENT

A lightning life meter according to the invention consists of sensors e.g. sensors embedded in the composite material of a rotor blade, integrated current probes in the sensitive data wires, online measurement of field concentration along the rotor blade and, if desirable, in the electronic parts of a wind energy turbine, and ground current measurement, together with an analytic model of the lightning behaviour of the components of a wind energy turbine and, in particular, of its rotor blades. The lightning life meter comprises a lightning detection system measuring the current range and time stamp of a lightning strike. Such a measurement system may comprise an antenna on the tower and/or magnetic cards in the blades. With such a wind energy turbine lightning life meter a better understanding of the lightning protection behaviour of the wind energy turbine is possible. The output of such an advanced lightning detection system could be integrated in the data warehouse for over lifetime lightning failure analysis and an advanced maintenance strategy particularly for offshore applications could be developed.

As schematically shown in the drawing, the lightning detection device 10 comprises several loop-wire like magnetic field concentration sensors 12 distributed along the extension of a rotor blade 14 in its shell. A conductor 16 extends through the rotor blade 14 and the ground current conducted by the conductor 16 in case a lightning strike is measured by a sensor 18. The magnetic field concentration sensors 12 as well as the ground current sensor 18 are connected to an evaluation unit 20. Based on the measured magnetic field concentration along the length of the rotor blade 14 and the ground current, the level and extent of a damage of the rotor blade resulting from a lightning strike can be calculated. Together with an analytic model of the lightning behaviour of the wind energy turbine, a lightning lifetime meter can be established.

Although the invention has been described and illustrated with reference to specific illustrative embodiments thereof, it is not intended that the invention be limited to those illustrative embodiments. Those skilled in the art will recognise that variations and modifications can be made without departing from the true scope of the invention as defined by the claims that follow. It is therefore intended to include within the invention all such variations and modifications as fall within the scope of the appended claims and equivalents thereof.

The invention claimed is:

1. A device for detecting damage of a rotor blade of a wind energy turbine caused by a lightning strike, comprising:
a plurality of magnetic or electric field sensors distributed along a length of the rotor blade for measuring a magnetic or electric field concentration along the length of the rotor blade; and
an evaluation unit connected to the magnetic or electric field sensors for receiving the measured magnetic or electric field concentration along the length of the rotor blade,
wherein the evaluation unit is configured to calculate damage of the rotor blade caused by the lightning strike based on the measured magnetic or electric field concentration along the length of the rotor blade, and
wherein each of the magnetic or electric field sensors comprises a loop-shaped ferromagnetic wire embedded in a shell of the rotor blade.

2. The device of claim 1, wherein the evaluation unit is configured to calculate the damage of the rotor blade caused by the lightning strike by comparing the measured magnetic or electric field concentration along the length of the rotor blade with a magnetic or electric field concentration along the length of the rotor blade when the rotor blade is not damaged.

3. The device of claim 1, further comprising a current conductor extending along the length of the rotor blade and connected to ground, and a current sensor connected to the current conductor for sensing a current caused by the lightning strike and passing through the current conductor, the evaluation unit being connected to the current sensor and configured to calculate the damage of the rotor blade caused by the lightning strike based on the measured magnetic or electric field concentration along the length of the rotor blade and the current.

4. The device of claim 1, wherein the evaluation unit is further configured to calculate a level of the damage of the rotor blade caused by the lightning strike based on the measured magnetic or electric field concentration along the length of the rotor blade and an analytic model of lightning behavior of the rotor blade.

5. A device for detecting damage of a rotor blade of a wind energy turbine caused by a lighting strike, comprising:
a plurality of magnetic or electric field sensors distributed along a length of the rotor blade for measuring a magnetic or electric field concentration induced by a flow of current in a current conductor along the length of the rotor blade from a lightning strike to the rotor blade; and
an evaluation unit connected to the magnetic or electric field sensors for receiving the measured magnetic or electric field concentration along the length of the rotor blade,
wherein the evaluation unit is configured to calculate damage to the rotor blade caused by the lightning strike based on the measured magnetic or electric field concentration along the length of the rotor blade, and
wherein each of the magnetic or electric field sensors comprises a loop-shaped ferromagnetic wire embedded in a shell of the rotor blade.

6. The device of claim 5, wherein the evaluation unit is configured to calculate the damage to the rotor blade caused by the lightning strike by comparing the measured magnetic or electric field concentration along the length of the rotor blade with a magnetic or electric field concentration along the length of the rotor blade when the rotor blade is not damaged.

7. The device of claim 5, wherein the current conductor is connected to ground, the device further comprising a current sensor connected to the current conductor for sensing the current, the evaluation unit being connected to the current sensor and configured to calculate the damage to the rotor blade caused by the lightning strike based on the measured magnetic or electric field concentration along the length of the rotor blade and the current.

8. The device of claim 5, wherein the evaluation unit is further configured to calculate a level of the damage to the rotor blade caused by the lightning strike based on the measured magnetic or electric field concentration along the length of the rotor blade and an analytic model of lightning behavior of the rotor blade.

* * * * *